United States Patent Office 3,551,502
Patented Dec. 29, 1970

1

3,551,502
(2-PROPYNYLOXY)-BETA-NITRO-STYRENES
Shigeo Seki, Tokyo, Kazuo Ichikawa, Hiratsuka-shi, Yujiro Yamada and Kozo Nagaoka, Yokohama-shi, and Bunzo Nomiya, Tokyo, Japan, assignors to Meiji Seika Kaisha, Ltd., Tokyo, Japan, a corporation of Japan
No Drawing. Filed July 19, 1968, Ser. No. 745,990
Claims priority, application Japan, Feb. 10, 1968, 43/8,035
Int. Cl. C07c 43/20
U.S. Cl. 260—612    10 Claims

ABSTRACT OF THE DISCLOSURE (2 - propynloxy) - beta - nitro - styrenes of the general formula:

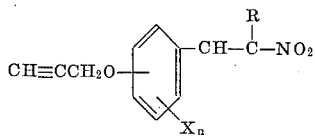

wherein R is a hydrogen atom or an alkyl radical of 1 to 4 carbon atoms and X is a hydrogen atom or a halogen atom and $n$ is an integer of 1 or 2. These compounds are useful for the treatment of Ehrlich ascites tumor and leukemia in mice.

---

This invention relates to new and useful compounds (2-propynyloxy)-beta-nitro-styrenes and to a process for the production of these compounds.

We have now found that the new compounds of the following general formula:

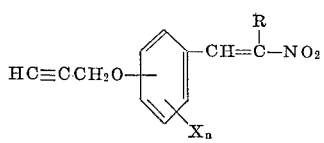

wherein R stands for a hydrogen atom or an alkyl radical, preferably an alkyl of 1 to 4 carbon atoms and X stands for a hydrogen atom or a halogen atom and $n$ is a whole number of 1 or 2 and are useful for the therapeutic treatment of Ehrlich ascites tumor and leukema in mice.

The preparation of some alkoxy-nitro-styrenes is disclosed, for example, in the "Journal of the American Chemical Society" vol. 74, pages 4486–4490 (1952) but the production of nitro-styrenes containing the triple bond in the substituent on the phenyl nucleus is not described in any literature.

According to an aspect of the present invention, therefore, there are provided (2-propynyloxy)-beta-nitro-styrenes of the general formula

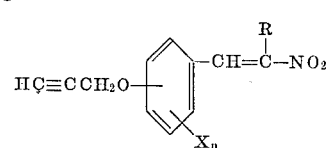

wherein R stands for a hydrogen atom or an alkyl radical of 1 to 4 carbon atoms and X is a hydrogen atom or a halogen atom, preferably bromine and chlorine and $n$ is a whole number of 1 to 2.

According to a preferred embodiment of the present invention there are provided (2-propynyloxy)-beta-nitro-styrenes of the general formula:

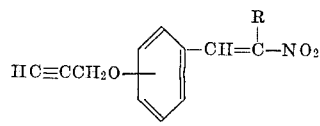

wherein R stands for a hydrogen atom or a methyl group.

As examples of the nitro-styrenes of the present invention, there are mentioned the following:

4-(2-propynyloxy)-beta-nitro-styrene,
4-(2-propynyloxy)-beta-methyl-beta-nitro-styrene,
4-(2-propynyloxy)-beta-ethyl-beta-nitro-styrene,
3,5-dibromo-4-(2-propynyloxy)-beta-nitro-styrene,
3,5-dichloro-4-(2-propynyloxy)-beta-nitro-styrene,
3-(2-propynyloxy)-beta-nitro-styrene,
2-(2-propynyloxy)-beta-nitro-styrene,
2-(2-propynyloxy)-beta-methyl-beta-nitro-styrene and
3,5-dibromo-2-(2-propynyloxy)-beta-nitro-styrene.

Each of the following compounds:

4-(2-propynyloxy)-beta-nitro-styrene,
3-(2-propynyloxy)-beta-nitro-styrene,
2-(2-propynyloxy)-beta-nitro-styrene,
4-(2-propynyloxy)-beta-methyl-beta-nitro-styrene and
2-(2-propynloxy)-beta-methyl-beta-nitro-styrene has been tested to treat Ehrlich ascites tumor in mice and has been found to exhibit a useful curing effect. The test was carried out in the following manner; a group consisting of five mice (average weight of body 20 grams per mouse) are inoculated peritoneally with 2,000,000 cells of mouse Ehrlich ascites tumor. 24 hours after the inoculation, the test compound is injected peritoneally in a dosage of 40 mg./kg. of mice per day per mouse for 6 days. Another group consisting of five mice having the same average weight of body is inoculated in the same way with the cells of Ehrlich tumor but this control group is not treated with the test compound. These two groups of mice are subsequently bred for one month. It has been found that all the mice survived at the end of the one month and that the mice treated with the above-mentioned test compounds did not suffer from the abnormal increase in the body weight which would usually be involved by the ascites cancer but the mice of the control group untreated suffered from the abnormal increase in the body weight. When insected, the mice of the group treated have not been found to show any retentive accumulation of the ascitic liquor, in contrast to the mice of the control group untreated.

The toxicity of the compounds of the present inventions is very low: 4-(2-propynyloxy)-beta-nitro-styrene has a $LD_{50}$ value of 57.5 mg./kg. in intravenous injection in mice. Acute toxicity is $LD_{50}$ of 1066.7 mg./kg. in peritoneal injection in mice. $LD_{50}$ in oral administration is 3000 mg./kg., and it has not been observed that the general conditions of mice are changed and that the body weight of mice is reduced. When 50 mg./kg. is dosaged per day over the period of 6 days, none of the mice are killed. The other compounds of the present invention have similarly low toxicity.

According to a further aspect of the present invention, we provide a process for the production of (2-propynyloxy)-beta-nitro-styrenes of the above-mentioned general formula which comprises reacting a nitro-alkane of the formula $R-CH_2-NO_2$ where R is a hydrogen atom or an alkyl radical of 1 to 4 carbon atoms with a (2-propynyloxy)-benzaldehyde represented by the formula:

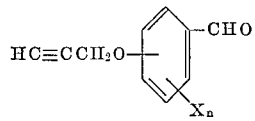

wherein X is a hydrogen atom or a halogen atom and $n$ is an integer of 1 or 2.

This process of the present invention may be carried out by conducting the interreaction of the reagents in an appropriate solvent such as a lower aliphatic alcohol, for example, methanol and ethanol and possibly in the presence of an amine as the catalyst. It is possible to carry out the reaction without using any solvent for the reactants. The reaction also may be conducted in the reaction medium comprising acetic acid as the solvent and in the presence of an amount of ammonium acetate as the catalyst.

The (2-propynyloxy)-benzaldehydes which are used as the starting material for the process of the present invention may be prepared readily by reacting the corresponding hydroxy-benzaldehyde with a 2-propynyl halide or 2-propynyl p-toluenesulfonate in the presence of an alkali carbonate or hydroxide and in an appropriate solvent such as acetone and alcohols, for example, methanol and ethanol.

The preparation of the compounds of the present invention are now illustrated with reference to the following examples but the scope of the present invention is not limited thereto.

EXAMPLE 1

To 800 cc. of methanol were added 42.5 g. of 4-(2-propynyloxy)-benzaldehyde and then 16.3 g. of nitro-methane and 2.5 cc. of n-butyl amine. The mixture was allowed to stand for 7 days under cooling by ice.

The yellow-colored precipitate so formed was filtered out and re-crystallized from ligroin to yield about 26 g. of 4-(2-propynyloxy)-beta-nitro-styrene having a melting point of 145–146° C.

EXAMPLE 2

A mixture of 15.9 g. of 4-(2-propynyloxy)-benzaldehyde, 7.5 g. of nitro-ethane and 0.2 cc. of n-butylamine was heated for 30 hours on a boiling water bath. After cooling, the precipitate formed was filtered out and recrystallized from ethanol to give about 5.0 g. of 4-(2-propynyloxy)-beta-methyl-beta-nitro-styrene having a melting point of 97–98° C.

EXAMPLE 3

16 g. of 3-(2-propynyloxy)-benzaldehyde, 6.0 g. of nitro-methane and 10 g. of ammonium acetate were added to 100 cc. of glacial acetic acid, and the mixture was heated for 2.5 hours on a boiling water bath. After cooling, the reaction mixture was poured into 500 cc. of water, and the precipitate was filtered out. Recrystallisation from ethanol gave about 5.0 g. of 3-(2-propynyloxy)-beta-nitro-styrene having a melting point of 50–51° C.

EXAMPLE 4

8.0 g. of 2-(2-propynyloxy)-benzaldehyde and 3.1 g. of nitro-methane were dissolved in 100 cc. of ethanol, and to the solution was added 0.1 cc. of n-butylamine. The resulting liquid mixture was left to stand for 7 days under cooling with ice. The precipitate deposited was filtered out and recrystallized from ethanol to give about 4.0 g. of 2-(2-propynyloxy)-beta-nitro-styrene having a melting point of 95–96° C.

EXAMPLE 5

1.6 g. of 2-(2-propynyloxy)-benzaldehyde, 0.8 g. of nitro-ethane and 1.0 g. of ammonium acetate were added to 10 cc. of glacial acetic acid, and the mixture was heated for 2.5 hours on a boiling water bath. After cooling, the reaction mixture was poured into 50 cc. of water and then cooled by ice to deposit an oil which solidified on further cooling. The solid was filtered, washed with water, dried and then recrystallized from ethanol to yield about 1.0 g. of 2-(2-propynyloxy)-beta-methyl-beta-nitro-styrene having a melting point of 70–71° C.

EXAMPLE 6

1.6 g. of 4-(2-propynyloxy)-benzaldehyde, 0.9 g. of nitro-propane and 1 g. of ammonium acetate were added to 10 cc. of glacial acetic acid, and the mixture was heated for 8 hours under reflux. After cooling, the reaction mixture was poured into 50 cc. of water and the precipitate formed was filtered, washed with water and then dried. Recrystallisation from ethanol gave about 0.5 g. of 4-(2-propynyloxy)-beta-ethyl-beta-nitro-styrene having a melting point of 95–96° C.

EXAMPLE 7

3.2 g. of 3,5-dibromo-2(2-propynyloxy)-benzaldehyde, 0.6 g. of nitro-methane and 1 g. of ammonium acetate were added to 10 cc. of glacial acetic acid, and the mixture was heated for 2.5 hours on a boiling water bath. The reaction mixture was cooled and then poured into 50 cc. of water. The precipitate so formed was filtered, washed with water and dried. Recrystallisation from ethanol gave about 1.6 g. of 3,5-dibromo-2-(2-propynyloxy)-beta-nitro-styrene having a melting point of 103–104° C.

EXAMPLE 8

3.2 g. of 3,5-dibromo-4(2-propynyloxy)-benzaldehyde, 0.6 g. of nitro-methane and 1 g. of ammonium acetate were added to 10 cc. of glacial acetic acid, and the mixture was heated for 2.5 hours on a boiling water bath. After cooling, the reaction mixture was poured into 50 cc. of water and the precipitate formed was filtered, washed with water and dried. Recrystallisation from ethanol gave about 1.2 g. of 3,5-dibromo-4-(2-propynyloxy)-beta-nitro-styrene having a melting point of 110° C.

EXAMPLE 9

2.7 g. of 3,5-dichloro-4-(2-propynyloxy)-benzaldehyde, 0.6 g. of nitro-methane and 1 g. of ammonium acetate were added to 10 cc. of glacial acetic acid, and the mixture was heated for 2 hours under reflux. After cooling, the liquid reaction mixture was poured into 50 cc. of water and the precipitate formed was filtered, washed with water and then dried. Recrystallisation from ethanol gave about 1.1 g. of 3,5-dichloro-4-(2-propynyloxy)-beta-nitro-styrene having a melting point of 125° C.

What we claim is:

1. (2-propynyloxy)-beta-nitro-styrenes of the general formula:

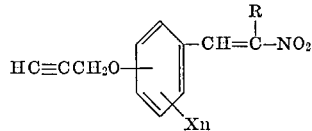

wherein R is a hydrogen atom or an alkyl radical of 1 to 4 carbon atoms and X is selected from the group consisting of hydrogen, bromine and chlorine and $n$ is the integer 1 or 2.

2. (2-propynyloxy)-beta-nitro-styrenes of the general formula:

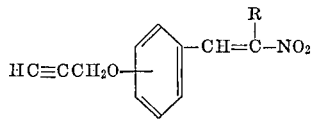

wherein R is hydrogen or methyl.
3. 4-(2-propynyloxy)-beta-nitro-styrene.
4. 4-(2-propynyloxy)-beta-methyl-beta-nitro-styrene.
5. 4-(2-propynyloxy)-beta-ethyl-beta-nitro-styrene.
6. 3,5-dibromo-4-(2-propynyloxy)-beta-nitro-styrene.
7. 3,5-dichloro-4-(2-propynyloxy)-beta-nitro-styrene.

8. 3-(2-propynyloxy)-beta-nitro-styrene.
9. 2-(2-propynyloxy)-beta-nitro-styrene.
10. 2-(2-propynyloxy)-beta-methyl-beta-nitro-styrene.

References Cited

UNITED STATES PATENTS 2,601,282   6/1952   Heinzelmann -------- 260—612
3,373,206   3/1968   Rocca -------------- 260—612

OTHER REFERENCES

Schales et al., Jour. Amer. Chem. Soc., vol. 74 (1952) pp. 4486–4490.

BERNARD HELFIN, Primary Examiner

U.S. Cl. X.R.

260—999